UNITED STATES PATENT OFFICE.

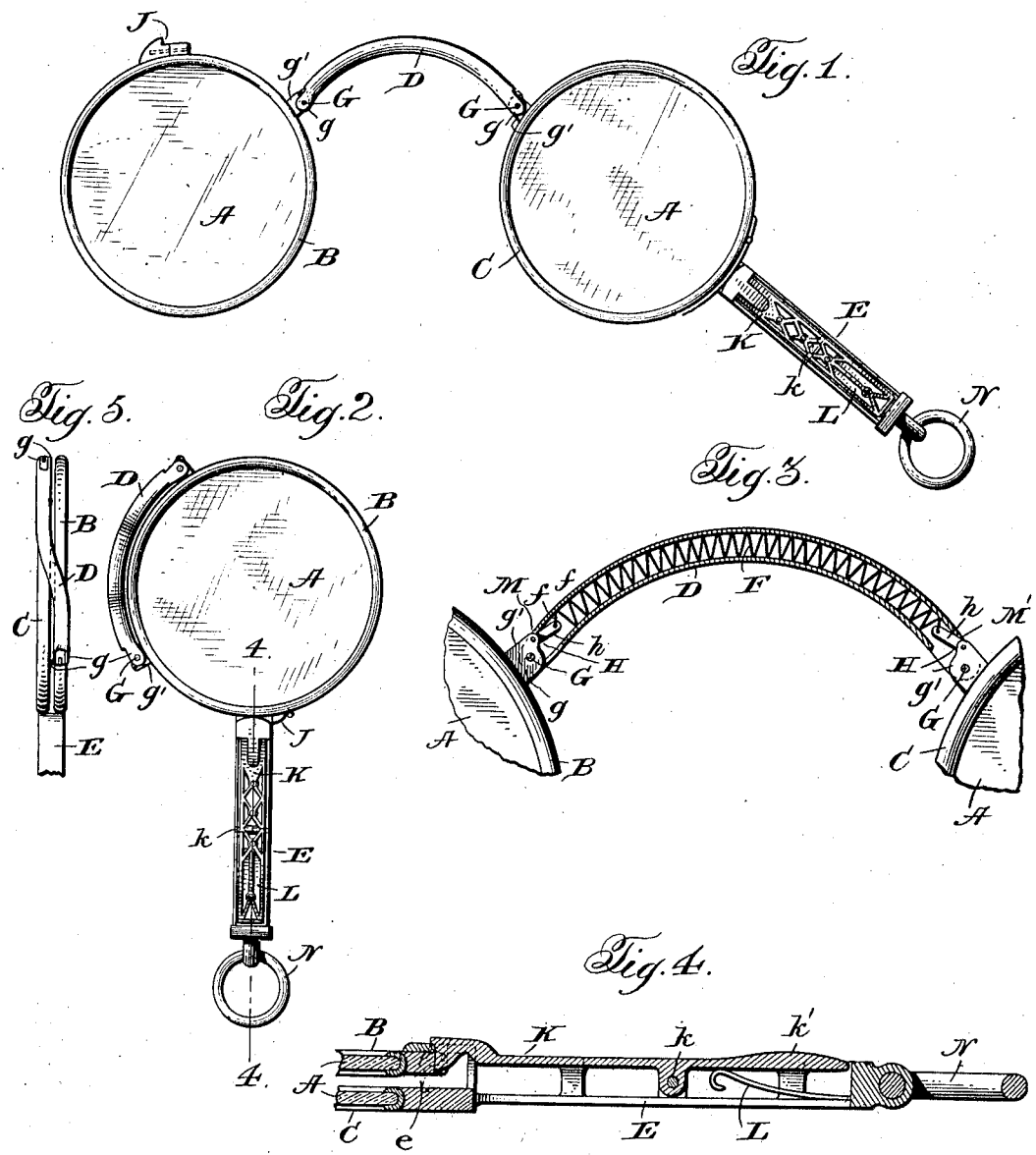

GEORGE A. BRIGGS, OF NEW YORK, N. Y.

LORGNETTE.

1,035,853.  Specification of Letters Patent.  Patented Aug. 20, 1912.

Application filed February 16, 1912. Serial No. 678,056.

*To all whom it may concern:*

Be it known that I, GEORGE A. BRIGGS, a citizen of the United States, residing at New York, in the county of New York and State of New York, have invented certain new and useful Improvements in Lorgnettes, of which the following is a specification, reference being had therein to the accompanying drawing.

This invention relates to improvements in lorgnettes, and has for its object the provision of a device of this character possessing practical mechanical construction, capable of folding into the smallest possible space, and presenting either in open or closed condition a refined and pleasing appearance.

Heretofore in the art, lorgnettes of many types have been provided, in the more useful of which the lenses were folded into a superposed relation where they were retained by a latch, and springs were employed for throwing the lenses into normally open relation upon release of the catch. At best, however, the spring and catch constructions heretofore known have been of such a nature as to require objectionable projecting parts or devices constituting unnecessary, unsightly, protuberances, and preventing that compactness and neatness desired in an article of the character under consideration.

In keeping with the present invention, constituting as it does an improvement in the art, as distinguished from those devices to which I have above alluded, my lorgnette is constructed, and the parts thereof are so arranged that in its folded condition the same occupies substantially no more space than the thickness of the superposed eyeglasses or lenses, while in open position the frames and bridge of the glasses are not unduly thick or of unusual shape suggestive so frequently of clumsy workmanship or weight. To these ends the device comprises what may be styled a stub handle substantially confined within the surfaces of which is a latch, said handle carrying one of the lens frames and lens therein, the other complementary lens frame and lens, and a hollow bridge or nose piece pivotally connecting the two lens frames and inclosing a spring also connected to said lens frames, adapted normally to maintain the lenses in open or operative relation, while permitting the lenses to close into superposed relation and be there locked by the latch when the proper force to overcome the tension of the spring is applied.

For the sake of imparting a better and full understanding of the invention, I have illustrated in the accompanying drawings forming part hereof the preferred embodiment of the invention. However, as will readily appear to those skilled in the art, the invention is capable of embodiment in forms and devices other than that herein specifically set forth.

In the drawings: Figure 1 is a front elevation of the complete lorgnette in open condition, Fig. 2 is a similar view of the same in closed condition, Fig. 3 is a fragmentary view, partly in elevation and partly in section, primarily for the purpose of illustrating the hollow nose piece or bridge with the spring confined therein, and the manner of connecting the lens frames to the bridge or nose piece and to the spring, Fig. 4 is a longitudinal sectional view on the line 4—4 of Fig. 2, and Fig. 5 is an edge view.

Referring more specifically to the drawings wherein like reference letters designate the same elements in the several views, A—A represent a pair of glasses or lenses of any desired character, capable of performing the uses for which they may be intended; B is the rim or frame of what may be termed the outer lens; C the rim or frame of the inner lens; D the nose piece or bridge, and E the handle. So far as these various elements, broadly speaking, and their general arrangement are concerned, they may be considered as conventional or usual in this art. It is rather to the improvements in these elements and their relation to secure the new results hereinabove outlined and as will hereinafter develop, that the present invention pertains.

The bridge or nose piece D is in outline arched, as shown, and in construction is tubular as is clearly seen from the sectional view, Fig. 3. The bridge therefore, while of usual size and performing its customary function, in the present instance constitutes a housing and guide for a coiled spring F, the said spring exerting a constant tendency to contract and draw the ends, indicated at $f$, inwardly toward the center of the bridge F, for a purpose as will presently appear. The ends of the tubular bridge D are split to constitute oppositely disposed separated ears $g$ for the reception of corresponding pivoted lugs $g'$ on the lens frames B and C, pivots G passing through said ears and lugs to pivotally connect the lens frames to the bridge or nose piece.

Pivotally connected to the lugs $g'$ at points offset from or eccentric to the pivots G,—as represented at H,—are links $h$, one connected to each lug $g'$ and to an end $f$ of the spring F. By reason of the pivoting of the lens frames and incidentally the lenses carried thereby to the bridge or nose piece, the same may be folded into a superposed relation. The frame B may be folded inwardly against the bridge or nose piece D,—it being noted, as shown in Fig. 2, that the bridge is formed on an arc of the circle of the frame B to closely overlie the latter,— and the frame B and bridge D may then be swung over the frame C so that the frames B and C are in exactly superposed relation.

A further detail in the construction should be here mentioned and it is the sinuous or compound curve formation of the bridge, illustrated in Fig. 5, enabling the same to span the space from the pivot of one rim to the pivot of the other rim when the rims are superposed.

To hold the rims in closed relation, a shoulder J is formed on the relatively free or outer frame B adapted to pass into the open end $e$ of the handle E and be there engaged by a latch K, the latter being in the nature of a lever pivoted to the handle intermediate of its ends, as at $k$ and having a thumb-operable extension $k'$ normally held upwardly through the medium of a spring L to retain the latch K in engagement with the shoulder J, but capable of convenient release by depression under the thumb of the user when the lorgnette is to be opened. It will be observed that the handle E is of short length or what has been styled a stub handle, and also that the latch is arranged between the side walls of the same and within the hollow interior thereof so as to be substantially confined within the surfaces of the handle itself, it being necessary to have but a slight elevation of the thumb extension $k'$ above the handle, and this is practically unnoticeable.

It will be understood that the spring F, immediately upon release of the latch K, will throw the outer lens and its frame B outwardly until the lug $g'$ abuts the end M of the bridge D, and the same action of the spring will draw the bridge upwardly until the corresponding end of the bridge M' abuts the lug $g'$ on the inner or fixed lens frame C. This insures a quick automatic opening of the lorgnette, and while the spring is of sufficient strength to retain the device in open position, for all practical purposes, it is, as previously discussed, of a nature to be readily expanded under force to permit the lenses to be closed.

When in the closed condition thereof the lorgnette occupies minimum space, both as to length and thickness, and a desirable characteristic of the improvements resides in the fact that the device may be readily carried in a card case or pocketbook, or even in the palm of the glove, or on a chain in a pocket or under a belt, for example, for which purpose an eye N is secured to the end of the stub handle.

I claim:

1. A lorgnette comprising the lenses, a hollow bridge piece pivotally connecting the same, and a spring in the bridge piece for relatively moving the lenses.

2. A lorgnette comprising the lenses, a hollow bridge piece pivotally connecting the same, and a coiled spring in the bridge piece for relatively moving the lenses connected at its opposite ends to the lenses.

3. A lorgnette comprising the lenses, a hollow bridge piece pivotally connecting the same, and a coiled spring in the bridge piece for relatively moving the lenses, connected at its opposite ends to the lenses at points eccentric to or offset from the pivotal connections between the bridge piece and the lenses.

4. A lorgnette comprising the lenses, the bridge piece pivotally connecting the same permitting the lenses to be folded, and a single means for opening the lenses and positioning them relative to the bridge piece, said means comprising a coiled spring common to the two lenses.

5. A lorgnette comprising the lenses, a hollow bridge piece pivotally connecting the same permitting the lenses to be folded, and a single means for opening the lenses and positioning them relative to the bridge piece, said means comprising a coiled spring common to the two lenses housed within the hollow nose piece.

6. A lorgnette comprising relatively foldable lenses, a handle therefor, and means substantially confined in the handle for retaining the lenses in closed position, said means comprising a lever latch pivoted in the handle and formed with a thumb piece, substantially as described.

7. A lorgnette comprising relatively foldable lenses, a handle therefor, and means substantially confined in the handle for retaining the lenses in closed position, said means comprising a lever latch pivoted in the handle and formed with a thumb piece, the exposed surface of the lever being substantially coincident with the adjacent surface of the handle to avoid projecting parts, substantially as described.

In testimony whereof I affix my signature in presence of two witnesses.

GEORGE A. BRIGGS.

Witnesses:
CHAS. F. SEXTON,
JOHN W. MORTIMER.